US009089150B2

(12) United States Patent
Chen et al.

(10) Patent No.: US 9,089,150 B2
(45) Date of Patent: Jul. 28, 2015

(54) METHOD FOR LOWERING FEED CONVERSION RATE

(75) Inventors: Tzong-Yueh Chen, Tainan (TW); Yi-Ling Huang, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 319 days.

(21) Appl. No.: 13/117,430

(22) Filed: May 27, 2011

(65) Prior Publication Data
US 2012/0301534 A1    Nov. 29, 2012

(51) Int. Cl.
*A23K 1/17*    (2006.01)
*A61K 38/00*   (2006.01)
*A61K 39/395*  (2006.01)
*A23K 1/16*    (2006.01)
*A23K 1/18*    (2006.01)

(52) U.S. Cl.
CPC .............. *A23K 1/1631* (2013.01); *A23K 1/188* (2013.01)

(58) Field of Classification Search
CPC . A61K 2039/505; A61K 38/00; A61K 38/18; A16K 47/48669; A23K 1/1631; A23K 1/188
See application file for complete search history.

(56) References Cited

U.S. PATENT DOCUMENTS

| 4,537,785 | A  |   | 8/1985  | Nichols         |          |
|-----------|----|---|---------|-----------------|----------|
| 6,387,664 | B1 |   | 5/2002  | Ikemoto         |          |
| 7,332,575 | B2 |   | 2/2008  | Lee et al.      |          |
| 2003/0118579 | A1 | * | 6/2003 | Walker et al. | 424/94.63 |
| 2005/0216962 | A1 |   | 9/2005 | Lee et al.      |          |
| 2008/0255035 | A1 |   | 10/2008 | Trieu et al.   |          |
| 2009/0126388 | A1 | * | 5/2009 | Johnson et al. | 62/298   |

FOREIGN PATENT DOCUMENTS

TW    200930307 A    7/2009

OTHER PUBLICATIONS

Rotllant et al. Sparc (Osteonectin) functions in morphogenesis of the pharyngeal skeleton and inner ear. Jul. 2008. Matrix Biol. vol. 27, No. 6, pp. 561-572.*
Nie et al. SPARC functions as an inhibitor of adipogenesis. 2009. J. Cell Commun. Signal. vol. 3, pp. 247-254.*
Feldman et al. Myostatin modulates adipogenesis to generate adipocytes with favorable metabolic effects. Oct. 17, 2006. PNAS. vol. 103, No. 42, p. 15675-15680.*
Skolnick, et al. From genes to protein structure and function: novel applications of computational approaches in the genomic era. Jan. 2000. Trends in Biotechnology, vol. 18, pp. 34-39.*
MacCallum, et al. Antibody-antigen Interactions: Contact Analysis and Binding Site Topography. 1996. Journal of Molecular Biology, vol. 262, pp. 732-745.*
De Pascalis et al. Grafting of "Abbreviated" Complementarity-Determining Regions Containing Specificity-Determining Residues Essential for Ligand Contact to Engineer a Less Immunogenic Humanized Monoclonal Antibody. 2002. Journal of Immunology. vol. 169, pp. 3076-3084.*
Casset, et al. A peptide mimetic of an anti-CD4 monoclonal antibody by rational design. 2003. Biochemical and Biophysical Research Communications. vol. 307, pp. 198-205.*
Vajdos, et al. Comprehensive Functional Maps of the Antigen-binding Site of an Anti-ErbB2 Antibody Obtained with Shotgun Scanning Mutagenesis. 2002. Journal of Molecular Biology. vol. 320, pp. 415-428.*
Holm et al. Functional mapping and single chain construction of the anti-cytokeratin 8 monoclonal antibody TS1. 2007. Molecular Immunology. vol. 44, pp. 1075-1084.*
Chen et al. Selection and Analysis of an Optimized Anti-VEGF Antibody: Crystal Structure of an Affinity-matured Fab in Complex with Antigen. 1999. Journal of Molecular Biology. vol. 293, pp. 865-881.*
Wu et al. Humanization of a Murine Monoclonal Antibody by Simultaneous Optimization of Framework and CDR Residues. 1999. Journal of Molecular Biology. vol. 294, pp. 151-162.*
Patent Examination Report No. 1 issued on Dec. 5, 2012 to the corresponding Australian Patent Application No. 2012202999.
Takana, S., et al.,"Isolation of a cDNA encoding a putative SPARC from the brine shrimp, Artemia franciscana", 2001, Gene, vol. 268, pp. 53-58.
Huang, Yi-Ling., "Functional analysis and of the grouper (Epinephelus coioides) SPARC in vitro and in vivo", Institute of Biotechnology, National Cheng Kung University, Jul. 2010. English Abstract only. 1 page.
Office Action issued on Feb. 4, 2014 by DJHKI for the counterpart ID Patent Application No. P00201200397 cites US 4537785 and US 2005216962, 3 pages.
English Translation of Office Action issued on Feb. 4, 2014 by DJHKI for the counterpart ID Patent Application No. P00201200397, 3 pages.

* cited by examiner

*Primary Examiner* — Anne Gussow
*Assistant Examiner* — Channing S Mahatan
(74) *Attorney, Agent, or Firm* — WPAT, P.C.; Anthony King; Kay Yang

(57) ABSTRACT

The present invention provides a method for lowering the feed conversion rate in a vertebrate comprising inhibiting the function of secreted protein acidic and rich in cysteine (SPARC), wherein the feed conversion rate is defined as the mass of the feed eaten divided by the body mass gain.

14 Claims, 2 Drawing Sheets

METHOD FOR LOWERING FEED CONVERSION RATE

BACKGROUND OF THE INVENTION

1. Field of the Invention

The present invention relates to a culture method, and more particularly, to a method for decreasing feed conversion rate.

2. Description of the Related Art

With the rapid increase in world population and decrease in arable land area, the available feed resources get increasingly short, and improvement of output per unit of area and increase of additional nutritional value are tendencies in feed production in the world.

As for the fish industry, because the fish harvest obtained from fishing from the sea is almost saturated, and the demand for fish products on the animal protein market daily increases, it is necessary to supplement the shortage in product supply from fishing industry with aquaculture.

*Epinephelus* spp. is a kind of warm-water fish belonging to *Epinephelus, Epinephelinae, Serranida, Perciforms, Osteichthyes*, is widely distributed in tropical and subtropical waters around the world, and is generally acknowledged as the most important economic fish species in the Asia and Pacific regions by the culture industry. In Taiwan, the fish culturinges are mainly *Epinephelus malabaricus, Epinephelus coioides, Epinephelus lanceolatus* and *Epinephelus fario*. Generally, the *Epinephelus* spp. must be cultured for at least 8 to 12 months before marketing; however, the final yield is not high. In addition to earlier mortality of young fish due to viral and bacterial infection, for example, weather factors, water pollution problems, selection of feed organisms and management during culturing all will increase risk to the practitioner. Therefore, how to improve the development rate of fish culturinges, shorten the culture time before marketing, and decrease the feed conversion rate (weight of feed fed/gain of body weight of fish body) and the potential risks during culturing has become a research direction worthy of hard work.

Secreted Protein Acidic and Rich in Cysteine (SPARC), also referred to as osteonectin or BM40 with a protein size of about 35-45 kDa and mainly distributed in the extracellular matrix (ECM), is a matricelluar protein, and is also a multifunctional glycoprotein having a property of binding to the ECM or a cell.

Although the SPARC is mainly distributed in the ECM; however, the function of the SPARC is different from a common structural protein in the matrix which is responsible for the structure constitution and supporting of a cell; on the contrary, the SPARC specially servers as a bridge connecting the cell and the ECM, and is a regulatory protein capable of regulating the production, storage and accumulation of several types of cellular matrix protein (Bradshaw and Sage, 2001, J Clin Invest 107; 1049-1054; Lane and Sage, 1994, FASEB J 8; 163-173). However, the SPARC is mainly expressed during embryo development, has great influence on cell differentiation, calcification and generation of tissue, bone development, morphology, and organ development. The expression level of this protein in an adult organism trends to be lowered, because obvious expression occurs mainly in a repair and reorganization process of injured skin or tissue (Lane and Sage, 1994).

The SPARC can be mainly divided into three functional domains (Hohenester et al., 1997, EMBO J 16; 3778-3786): 1. acidic domain at a N terminal of the protein, which is capable of bonding with 5-8 calcium ions with weak affinity and has functions of inhibiting cell extension and regulating production of ECM; 2. Follistatin like domain, which includes multiple Cysteines, has function similar to follistatin, and is capable of inhibiting cell proliferation, and further includes another specific sequence, that is, a copper ion binding sequence (K) GHK (Iruela-Arispe et al., 1995, Mol Biol Cell 6; 327-343), and has vascular proliferation promoting function; and 3. extracellular calcium ion binding domain (EC domain), which is a C-terminal of SPARC, has two EF-hand motifs, is capable of binding with calcium ions with high affinity, and is capable of binding with a cell or some collagens, and further has effect of inhibiting cell proliferation and extension (Maurer et al., 1995, J Mol Biol 253; 347-357).

Currently, some results are got through researches and discussions in biological functions of SPARC, and several properties are found through observation of in vitro endothelial cell culture of mouse: (I) expression of SPARC can inhibit the extension of cell morphology to make a cell nearly round (Murphy-Ullrich et al., 1991, J Cell Biol 115; 1127-1136); regulating the composition of ECM and expression of some ECM proteins, to adjust the binding of a cell with an extracellular matrix to change the cell morphology and migration ability (Hasselaar et al., 1991, J Biol Chem 266; 13178-13184; and Tremble et al., 1993, J Cell Biol 121; 1433-1444); (II) inhibiting the progression of cell cycle, to arrest the cycle in mid-G1 phase, and thus having cell growth inhibiting function (Yan and Sage, 1999, J Histochem Cytochem 47; 1495-1506); (III) it was found in researches of vascular cell culture that endothelial cells have a vascular proliferation promoting property (Funk and Sage, 1991, Proc. Natl. Acad. Sci. USA 88; 2648-2652). In vivo, it is found that mouse with SPARC gene knocked down is afflicted with cataract no long after being born, and thus it is postulated that SPARC is an essential protein for development of eye lens (Yan and Sage, 1999). It is also found through researches that in mice with sparc gene knocked down, abnormal changes in skin structure, thickened fatty layer, increases in volume and number of lipocyte, and rise of concentration of leptin secreted by lipocytes in the blood are observed, and thus it is postulated that the SPARC protein has correlation to in vivo regulation of the changes of the adipose amount in the body (Bradshaw et al., 2003, Proc. Natl. Acad. Sci. USA 100; 6045-6050).

Myostatin, also referred to as growth and differentiation factor-8 (GDF-8), is a member in transforming growth factor TGF-β family. Myostatin may negatively regulate the growth and differentiation of muscle. It can be found through researches in bovine and human bodies that when the function of myostatin is lost, because the negative regulation of the growth and differentiation of muscle cannot effect, a phenotype of muscle increasing occurs (McPherron and Lee, 1997, Proc. Natl. Acad. Sci. USA 94, 12457-12461; and Schuelke et al, 2004, The New England Journal of Medicine 350, 2682-2688). In the researches with mammal, myostatin in mice is knocked down (McPherron and Lee, Proc. Natl. Acad. Sci. USA 94; 12457-12461), high-level expression of myostatin inhibiting protein (for example, follistatin) in the muscle of rice or disabling the function the receptor protein ActRIIB essential for signal transmission (Lee and McPherron, 2001, Proc. Natl. Acad. Sci. USA 98; 9306-9311) will cause the occurrence of muscle increasing. In the researches with bony fishes, antisense morpholino knock-down technology is used to inhibit mRNA of myostatin-1 in the embryo of zebra fish, so as to accelerate the embryo growth (Amali et al, 2004, Developmental Dynamics 229; 847-856); or RNAi technology is used to silence myostatin-1 in zebra fish, and thus features of giant zebra fish occur (Acosta et al, 2005, Journal of Biotechnology 119; 324-331). The muscle cells are further researched with tissue slice, and it is found that hypertrophy of the volume and hyperplasia of the number of the muscle cells may be causes causing muscling.

On the other hand, it is pointed out in in-vitro cell line researches that, if myostatin is expressed in C2C12 myoblast line at high level, the proliferation of myoblast can be inhibited, to arrest the cell in G1 to S phases in the cell cycle (Thomas et al, 2000, The Journal of Biological Chemistry 275; 40235-40243). On the other hand, if myostatin is expressed in muscle astrocyte at high level, it is found that myostatin may inhibit the activation and self-renewal of muscle astrocyte (McCroskery, 2003, The Journal of Cell Biology 162; 1135-1147), which also proves that myostatin does play a role of negative regulation in the development of muscle. In addition to the regulation in muscle cells, it is pointed out in other literatures that myostatin has the function of inhibiting adipogenesis (Rebbapragada et al, 2003, Molecular and Cellular Biology 23; 7230-7242), and it is also pointed out in researches that myostatin has the function of inhibiting apoptosis of myoblasts (Rios et al, 2001, Biochemical and Biophysical Research Communications 280; 561-566).

However, in researches of myostatin and SPARC, there is no reports about the feed conversion rate (weight of feed fed/gain of body weight), which is also critical for cost control in culture industry, in addition to muscle gain. Therefore, a method for decreasing the feed conversion rate is still needed to be developed in the industry, so as to improve the development rate of culturing.

SUMMARY OF THE INVENTION

The present invention is directed to a method for decreasing feed conversion rate in a vertebrate, so as to improve the development rate of culturing, shorten the culture time before marketing, and decrease the feed conversion rate and the potential risks during culturing.

The invention provides a method for culturing a vertebrate comprising: immuno-inhibiting the function of secreted protein acidic and rich in cysteine (SPARC) in the vertebrate by feeding the vertebrate with a feed composition comprising a secreted protein acidic and rich in cysteine, a fragment of secreted protein acidic and rich in cysteine, an anti-secreted protein acidic and rich in cysteine antibody, or an anti-fragment of secreted protein acidic and rich in cysteine antibody; wherein the secreted protein acidic and rich in cysteine or the fragment of secreted protein acidic and rich in cysteine is expressed in a microorganism, and harvesting the vertebrate, wherein a feed conversion rate defined as the mass of the feed eaten divided by the body mass gain of the vertebrate is lowered compared to that of a vertebrate without immuno-inhibition of the function of secreted protein acidic and rich in cysteine.

Preferably, the method according to the invention further comprises administrating myostatin, a fragment of myostatin, an anti-myostatin antibody or a fragment thereof to the vertebrate.

DETAILED DESCRIPTION OF THE INVENTION

Figure 1:
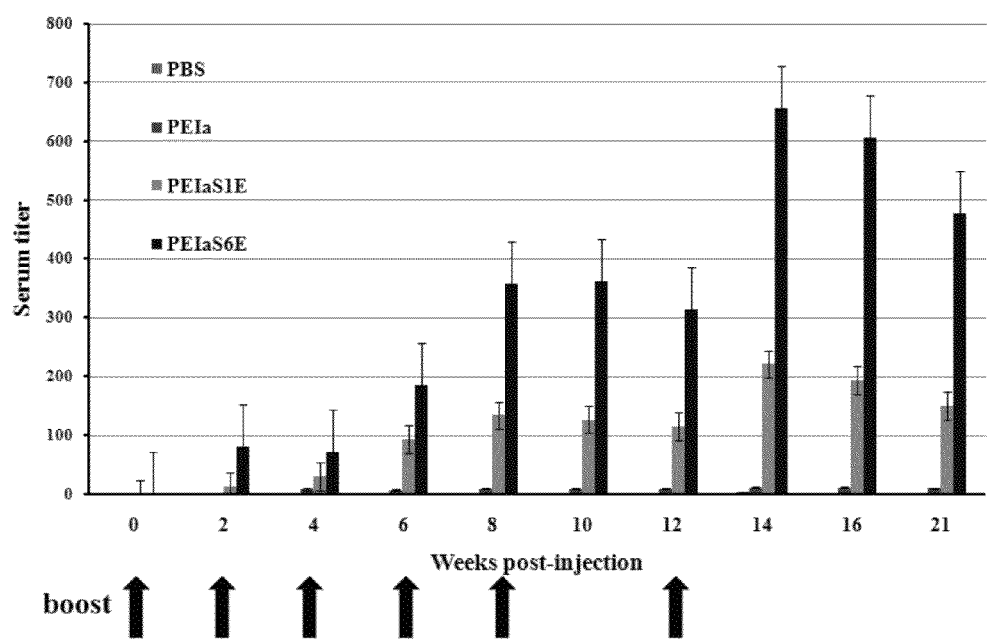
FIG. 1 shows the serum titer of antibody of the groupers subjected to immuno-inhibition of secreted protein acidic and rich in cysteine (SPARC).

The invention relates to a method for culturing a vertebrate comprising: immuno-inhibiting the function of secreted protein acidic and rich in cysteine (SPARC) in the vertebrate, feeding the vertebrate with feed, and harvesting the vertebrate by feeding the vertebrate with a feed composition comprising a secreted protein acidic and rich in cysteine, a fragment of secreted protein acidic and rich in cysteine, an anti-secreted protein acidic and rich in cysteine antibody, or an anti-fragment of secreted protein acidic and rich in cysteine antibody; wherein the secreted protein acidic and rich in cysteine or the fragment of secreted protein acidic and rich in cysteine is expressed in a microorganism, and harvesting the vertebrate, wherein a feed conversion rate defined as the mass of the feed eaten divided by the body mass gain of the vertebrate is lowered compared to that of a vertebrate without immuno-inhibition of the function of secreted protein acidic and rich in cysteine.

Preferably, the method according to the invention further comprises administrating myostatin, a fragment of myostatin, an anti-myostatin antibody or a fragment thereof to the vertebrate.

The method of the present invention is suitable for the vertebrate. Preferably, the method of the present invention is suitable for fishes; and more preferably, the fish belongs to Osteichthyes, currently myostatin of fishes including *Danio rerio*, Atlantic salmon, *Mozambique tilapia, Morone saxatilis, Sparus aurata, Oncorhynchus mykiss, Salvelinus fontinalis, Silurus asotus, Epinephelus coioides* and *Lateolabrax japonicus* has been cloned, and the amino acid sequence has high conservation, and thus it is postulated that the myostatins have the same function; particularly preferably, the fish belongs to *Perciforms, Osteichthyes*; particularly preferably, the fish belongs to *Serranidae, Perciforms, Osteichthyes*; particularly preferably, the fish belongs to *Epinephelinae, Serranidae, Perciforms, Osteichthyes*; particularly preferably, the fish belongs to *Epinephelus, Epinephelinae, Serranidae, Perciforms, Osteichthyes*; and most preferably, the fish is *Epinephelus coioides*.

The method of the present invention is to improve the feed conversion rate in a vertebrate by inhibiting the function of secreted protein acidic and rich in cysteine and/or myostatin at stages of, for example, gene, transcription, translation, protein activity and signaling path. Persons of ordinary skill in the art can select a suitable operation to inhibit the function of secreted protein acidic and rich in cysteine and/or myostatin, for example, secreted protein acidic and rich in cysteine and/or myostatin is removed from the genome using a gene knock-down method, mRNA is interfered and inhibited with an anti-sense nucleic acid or RNA, the activity of secreted protein acidic and rich in cysteine and/or myostatin itself is inhibited or the function of a receptor protein is inhibited. Preferably, the function of secreted protein acidic and rich in cysteine and/or myostatin is inhibited through an immuno-inhibition method, in which the protein activity is inhibited, and little systematic adverse effect on a vertebrate is caused.

In a preferred embodiment of the present invention, the immuno-inhibition method is to administrating a secreted protein acidic and rich in cysteine and/or myostatin, a fragment of secreted protein acidic and rich in cysteine and/or myostatin, an anti-secreted protein acidic and rich in cysteine and/or myostatin antibody or a fragment thereof to the vertebrate. Preferably, the fragment of secreted protein acidic and rich in cysteine and/or myostatin is an epitope. Persons of ordinary skill in the art can clone and obtain a secreted protein acidic and rich in cysteine and/or myostatin encoding gene, to express the protein or an epitope thereof, and immunize the protein or the epitope into an animal body, so as to obtain an anti-secreted protein acidic and rich in cysteine and/or anti-myostatin antibody or an antibody of an epitope thereof. The antibody of the present invention can be obtained by immunizing secreted protein acidic and rich in cysteine and/or myostatin or the epitope thereof into other animals, and purifying, or by directing immunizing secreted protein acidic and rich in cysteine and/or myostatin or the epitope thereof into a vertebrate body, so as to enable the vertebrate body itself to generate the antibody. The antibody of the present invention may be a polyclonal antibody or a monoclonal antibody, and preferably, the antibody is a polyclonal antibody.

As used herein, the term "epitope" refers to a fragment capable of inducing an immune response to generate an antigen in a protein antigen, which can be obtained through structure prediction or by selecting a protein fragment to observe the immune response in an immunized animal.

Myostatin is highly similar to other members in TGF-β family in sequence, and includes three parts: (1) N-terminal hydrophobic domain, as signal released from protein secretion; (2) highly conserved protein cleavage position RXRR (SEQ ID NO. 2); (3) cysteine-rich C-terminal active domain (Sharma et al, 1999, Journal of cellular physiology 180; 1-9). It is documented in many reports that the amino acid sequence of myostatin in a vertebrate has high conservation in C-terminal active domain (McPherron et al, 1997, Nature 387; 83-90). Currently, a monoclonal antibody JA16 having high specificity for myostatin in a research on myostatin (Whittemore et al, 2003, Biochemical and Biophysical Research Communications 300; 965-971), it is found by analyzing the binding position with myostatin that the binding position is at 15 amino acids DFGLDCDEHSTESRC (SEQ ID NO. 1) at the C terminal of myostatin of mouse, and thus it can be known that the C-terminal domain is an antigenic fragment. Therefore, preferably, the antigenic fragment of the myostatin is the C-terminal domain of myostatin; and more preferably, the C-terminal domain of myostatin has a sequence as shown in SEQ ID NO. 1.

On the other hand, as the epitope is a small peptide fragment, if the small fragment antigen is directly immunized in an animal, the immune response may be unsatisfactory. It is preferred to construct a linear array epitope (LAE) containing tandem repeated units, to improve the immune response. In addition, a bacterial toxin may be used to assist the delivery of the antigen, by using the toxin eliminated toxin activity as transportation system, and thereby the overall immunization effect by using the properties of the toxin. Preferably, the LAE of the present invention is fused with a domain Ia of *Pseudomonas* exotoxin (PE) A. The *Pseudomonas* exotoxin has a molecular weight of 66 kDa and contains 613 amino acids, and the protein structure mainly includes three domains, and the domain Ia (amino acids 1-252) is a receptor binding region and is responsible for binding with α2-macroglobulin/low density lipoprotein receptor (LDLR) on the cell membrane of a mammal cell, and then enters into the endomembrane system of the cell through receptor-mediated endocytosis. It is proved that the *Pseudomonas* exotoxin A is capable efficiently enhancing the induced immune response (Donnelly et al, 1993, Proc. Natl. Acad. Sci. USA 90; 3530-3534).

In one preferred embodiment of the invention, the secreted protein acidic and rich in cysteine and/or myostatin, the fragment of secreted protein acidic and rich in cysteine and/or myostatin, the anti-secreted protein acidic and rich in cysteine and/or myostatin antibody or the fragment thereof is contained in a feed composition.

In one more preferred embodiment of the invention, the secreted protein acidic and rich in cysteine and/or myostatin, the fragment of secreted protein acidic and rich in cysteine and/or myostatin, the anti-secreted protein acidic and rich in cysteine and/or myostatin antibody or the fragment thereof is bioencapsulated in a shrimp. The shrimp is usually used as the feed for being easily administrated to the fish. Preferably, the shrimp is larvae; more preferably, the larvae are frozen dried into a powder.

In one another preferred embodiment of the invention, the secreted protein acidic and rich in cysteine and/or myostatin, the fragment of secreted protein acidic and rich in cysteine and/or myostatin, the anti-secreted protein acidic and rich in cysteine and/or myostatin antibody or the fragment thereof is administrated by injection.

In one preferred embodiment of the invention, immuno-inhibiting the function of secreted protein acidic and rich in cysteine is effective on lowering feed conversion rate more than about 5% compared to the control group; more preferably, between about 8% to about 40%.

The following examples are given for the purpose of illustration only and are not intended to limit the scope of the present invention.

EXAMPLES

Example 1

Immuno-Inhibition of Secreted Protein Acidic and Rich in Cysteine (SPARC)

Animal Experiment:

A total of 48 *Epinephelus coioides* with an average weight of 70±10 g and an average length of 5 to 6 inches were used in the control group and the experiment groups, and the experiment time was 5 months. The antigen was prepared by amplifying sparc gene using primer 1 (SEQ ID NO. 3) and primer 2 (SEQ ID NO. 4). The designed antigen was mainly selected from candidates of one unit (19 amino acid length) and six units of SPARC antigens, attached with the domain Ia of *Pseudomonas* exotoxin A at the forepart, and intraperitoneally injected into the body of *Epinephelus* spp. Equal amount of antigen protein and Freund's Complete Adjuvant were homogeneously mixed, and then immunized in *Epinephelus* spp. by injecting 40 μg of antigen protein per fish, and the groups included two control groups injected respectively with PBS and PEIa (containing domain Ia of *Pseudomonas* exotoxin A), and two experiment groups injected respectively with PEIaS1E (containing domain Ia of *Pseudomonas* exotoxin A and one unit of SPARC antigens) and PEIaS6E (containing domain Ia of *Pseudomonas* exotoxin A and six units of SPARC antigens). Boost injections were performed respectively at 1, 2, 4, 6, 8, and 12 weeks after the first immunization injection, and fish blood were taken before and during immunization, which was solidified after standing for 20-40 min, centrifuged, and then sampled for the blood supernatant for enzyme-linked immunosorbent assay (ELISA), to determine the antibody titer against endogenous protein in the blood.

Enzyme-Linked ImmunoSorbent Assay (ELISA)

Using the antigen-antibody specific binding principle, 1 μg (100 μl) SPARC-His recombinant protein fragment was firstly homogeneously mixed with a coating buffer, the mixture was added to the bottom of a 96-well Nunc-Immuno™ Plate (NUNC™), and stood overnight at 4° C., to allow the protein to bind to the bottom. The plate was washed 3 times with PBST, added with 100 μl TBST solution containing 5% skim milk and reacted for 1 h at room temperature, and washed at least 3 times with PBST again. Test serum diluted with PBST was used as primary antibody, added into the wells, and stood at room temperature for about 2-3 h. The plate was washed at least 3 times with PBST, and then added with 100 µl mouse anti-*Epinephelus* spp. serum as secondary antibody, stood for 1 h at room temperature, and washed at least 3 times with PBST. Finally, 100 µl goat anti mouse serum attached with alkaline phosphatase at the aftpart was added as tertiary antibody, and stood for 1 h at room temperature, and then the plate was washed with PBST. Finally, 50 µl substrate solution p-Nitrophenyl Phosphate Tablets was added to each well, stood at room temperature for 30 min (depending on color development), and then measured for absorbance at $OD_{405}$ with an enzymatic cell analyzer.

Before and at 1, 2, 4, 6, 8, 10, 12, 14, 16, and 21 weeks after immunization of *Epinephelus* spp., blood of *Epinephelus* spp. was drawn, the serum was separated and analyzed by using ELISA, to detect the antibody titer of *Epinephelus* spp. serum against SPARC protein active region of recombinant *Epinephelus* spp. after injecting the recombinant fusion protein containing SPARC antigen fragment at each stage (FIG. 1). It can be found that the antibody titer is detected at 2 weeks after immunization, and obviously increases at the 6 weeks for PEIaS1E and PEIaS6E. After the boost injection at 8 weeks, and an additional boost injection at 12 weeks, the antibody titer rises again, and reaches to the highest level at 14 weeks, and the antibody titers of the PEIaS1E and PEIaS6E experiment groups are both higher than that of the PEIa control group, in which the rise of the antibody titer in the PEIa6E group is most notable, and the antibody titer reaches to about 700. As for the other control group injected with PBS, the antibody titer of *Epinephelus* spp. serum is not detected at all (FIG. 1).

Feed Conversion Rate

The total feed consumption and the feed conversion rate in the 5 months of animal experiment were calculated. The statistical results show that the total feed consumptions of the PEIaS1E and PEIaS6E experiment groups in the 5 months are 2750 g, and 2867 g, and the total feed consumptions of the two PBS and PEIa control groups are 2639 g, and 2806 g. The total feed consumptions of the experiment groups are higher than that of the PBS control group, but are not obviously different from the PEIa experiment group. The statistical data of feed conversion rate (FCR) was further obtained. It is found from the statistical results that the average feed conversion rates are 2.75, and 1.7791 for the PEIaS1E and PEIaS6E experiment groups, and are 3.0686 and 2.806 for the two PBS and PEIa control groups (as shown in Table 1). It shows that administrating PEIaS1E is effective on lowering about 10% FCR compared to the PBS control group, and administrating PEIaS6E is effective on lowering about 42% FCR compared to the PBS control group. That is, fewer feed is consumed in the experiment group administrated with SPARC antigen fragment before marketing.

TABLE 1

|  | PBS | PEIa | PEIaS1E | PEIaS6E |
| --- | --- | --- | --- | --- |
| Feed conversion rate | 3.0686 | 2.806 | 2.75 | 1.7791 |

Example 2

Immuno-Inhibition of Myostatin

Preparation of *E. coli* Expressing Myostatin Antigen Fragment Recombinant Protein 35 L fermentation culture process was established, to culture *E. coli* BL21(DE3) strain containing an antigen fragment in a 50 L fermentation tank. 4 tubes of 5 mL bacterial strain cultured overnight with LB/Ampicillin medium at 37° C. were respectively inoculated into 0.2 L LB/Ampicillin medium and a total of 1 L were shook and cultured at 37° C. to $OD_{600}$ of 0.3, and then added into 35 L medium for culturing, and sampled for determining $OD_{600}$ every two hours to monitor the variations of the growth curve. Suitable time points were further selected according to the growth curve, IPTG having a final concentration of 0.1 mM was added to induce *E. coli* to express the fusion protein at a high level, shook and cultured at 37° C. for 3 h, and centrifuged to recover the bacteria. The expression of the fusion protein was determined through SDS-PAGE and western blotting, to determine the optimum 35 L fermentation conditions.

Preparation of Oral Vaccine of Bioencapsulated *Artemia salina* L.

Incubation of *Artemia salina* L.:

4 g *Artemia salina* L. dry eggs was weighed, placed in a 250 ml beaker, and immersed in the added 150 ml fresh water for 0.5 h. Resting eggs of *Artemia salina* L. was filtered with a screen and washed with a suitable amount of fresh water. The resting eggs of *Artemia salina* L. was added into 5 L of incubation solution, and uniformly distributed. Air stone was placed and started to pump air, and the air intake volume was adjusted to be about 500 $cm^3$/min (to maintain the dissolved oxygen to be higher than 2 ppm). The lighting device was turned on, the room temperature and the water temperature were kept at 26-28° C. After 24 h, the pumping of air was stopped, and the lighting device was moved to the bottom of the container, *Artemia salina* L. larvae was attracted to the bottom of the container by phototaxis, and stood for 5 min. At this time, the un-incubated eggs and empty egg shells after incubation floated to the surface of the water, and the floated egg shells were removed by siphon principle or other tools capable of absorbing water. The incubated first instar larvae was gently filtered with a screen (pore size of 120 µm), and gently washed with seawater, and then added into 2 L of refreshed incubation solution. The hatch solution was gently stirred, to uniformly distribute the *Artemia salina* L. larvae. 1 ml of incubation solution was aspirated, and dripped into 1 ml grid count plate. In order to avoid the perturbation of the larvae, the larvae might be killed by placing on a hot plate of 50° C. for 10 min, so as to facilitate the counting. In counting, the count plate was placed under a dissecting microscope at a magnification of 60-100 for observation. The count plate was cut with 1000 grids, and the count manner might be that 10×10 grids (number of larvae per 0.1 ml) were selected at random to count the number of the larvae, and the numbers on other positions of the dish were likely counted, averaged, multiplied by 10, to obtain the number of larvae per ml, or the total number of the larvae on the plate might be counted. According to the count result, the density of *Artemia salina* L. was adjusted to 500 larvae per ml. Air stone was placed and started to pump air, and the air intake volume was adjusted to be about 300-400 $cm^3$/min (to maintain the dissolved oxygen to be higher than 2 ppm). The room temperature and the water temperate were kept at 26-28° C. After 12-18 h of incubation, the *Artemia salina* L. experienced the first ecdysis and became a second instar larvae. At this time, the bioencapsulation step is to be performed.

Bioencapsulation:

*E. coli* was centrifuged and settled down at 1000×g. Surplus medium was decanted, and the bacteria were re-suspended with equal amount of PBS, to wash off the surplus medium on the bacteria. Centrifugation at 1000×g was performed again, and the bacteria were re-suspended with a suitable amount of PBS, to prepare a bacteria solution with a concentration of 1×10¹⁰ cfu/mL. The sterilization method was heating sterilization, in which the bacteria solution was placed in a water bath of 65° C. for 10 min, and then the sterilized solution was placed on ice for 10 min. Second instar larvae of *Artemia salina* L. was packaged into desired volumes, and added with the prepared bacteria solution to a final concentration of *E. coli* of about 1×10¹⁰ cfu/mL, and air was suitably pumped for 2 h.

Determination of Encapsulation Results:

Pumping of air was stopped before sampling, 2 ml encapsulated *Artemia salina* L. solution was aspirated onto a small screen and washed with large quantities of fresh water. *Artemia salina* L. larvae was aspirated to a centrifuge tube. The micro-centrifuge tube was placed in a refrigerator at −20° C. for 10 min to freeze the *Artemia salina* L. larvae to death, and then dead *Artemia salina* L. larvae was poured in a 9 cm culture dish, a small amount of sterilized water was added to uniformly distribute the *Artemia salina* L. larvae, and then 500 second instar larvae were aspirated with a Pippetman to a micro-centrifuge tube, centrifuged at 3000 rpm to centralize the larvae at the bottom of the centrifuge tube, water in the centrifuge tube was removed and replaced with 100 μl sterilized water. *Artemia salina* L. larvae was carefully ground in the micro-centrifuge tube with a micro-ground bar. The samples were subjected to SDS-PAGE and Western blotting.

Animal Experiment

*Artemia salina* L. Group:

The experiment animals were dived into 4 groups: experiment group PEIa-epitope group, and three control groups fed respectively with a common feed, feed containing *Artemia salina* L. and feed containing *Artemia salina* L. encapsulated with PEIa fragment. A total of 40 *Epinephelus coioides* with an average weight of about 157 g and an average length of 5 to 6 inches were used, the experiment time was about 4 months. The animals were fed with antigen containing feed every Monday, Tuesday, Wednesday, with common feed every Thursday, Friday, and Saturday, and fasted at Sunday, and fish flood were taken before and at 2 weeks after immunization, which was solidified after standing for 20-40 min, centrifuged, and then sampled for the blood supernatant for ELISA, to determine the antibody titer against endogenous protein in the blood.

Preparation of Feed Containing *Artemia salina* L.:

Water of filtered or unfiltered *Artemia salina* L. of second instar was removed as much as possible, and freeze dried into a powder by using a freezer drier. The *Artemia salina* L. powder was mixed with a common comminuted feed at a ratio of 1:1000, and then re-granulated.

Preparation of Feed Composition:

The bacteria liquid was concentrated, and freeze dried into a powder by using a freezer drier. The bacteria powder was mixed with a common comminuted feed at a ratio of 1 g feed to 3.3×10⁹ cfu *E. coli* bacteria powder, and then re-granulated.

Results

*Artemia salina* L. Group

Figure 2:
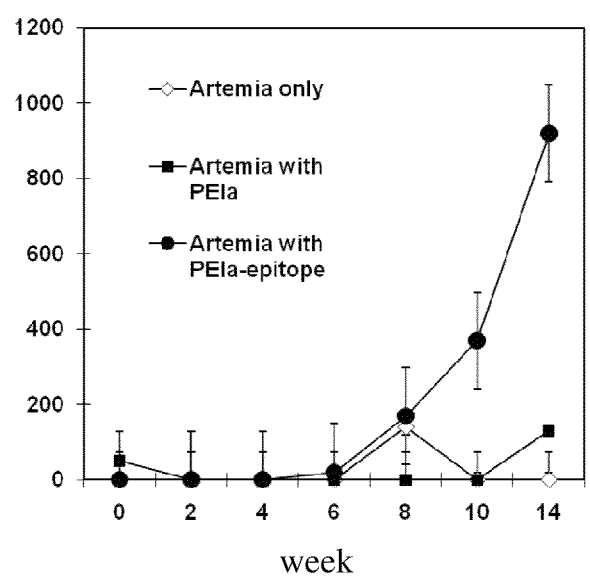
FIG. 2 shows the serum titer of antibody of the groupers subjected to immuno-inhibition of myostatin.

Blood of *Epinephelus* spp. was drawn first, the serum was separated to detect the antibody titer of *Epinephelus* spp. serum for C-terminal antigen active region of recombinant *Epinephelus* spp. myostatin after feeding the recombinant fusion protein containing recombinant antigen fragment containing myostatin antigen fragment at each stage with ELISA. The antibody titer was detected at 10 weeks after immunization, and continuously rose till the 16 weeks, in which the antibody titer of the PEIa-epitope group was higher than those the three control groups fed with the common feed, the feed containing *Artemia salina* L. and the feed containing *Artemia salina* L. encapsulated with PEIa fragment, and the antibody titer reached to about 920 (as shown in FIG. 2).

The total feed consumption and the feed conversion rate in the 4 months of animal experiment were calculated. It is found from statistical data that the total feed consumptions of the PEIa-epitope experiment group and the other three control groups in the 4 months are approximately equivalent, the average feed conversion rate is 1.35 for the PEIa-epitope experiment group, and is 1.72, 1.76, and 1.82 for the three control groups fed with the common feed, the feed containing *Artemia salina* L. and the feed containing *Artemia salina* L. encapsulated with PEIa fragment, that is, fewer feed is consumed in the experiment group fed with myostatin antigen fragment before marketing, and *Epinephelus* spp with more meat is obtained (as shown in Table 2).

TABLE 2

|     | Control | Artemia only | Artemia with PEIa | Artemia with PEIa-epitope |
| --- | --- | --- | --- | --- |
| FCR | 1.72 | 1.76 | 1.82 | 1.35 |

While embodiments of the present invention have been illustrated and described, various modifications and improvements can be made by persons skilled in the art. It is intended that the present invention is not limited to the particular forms as illustrated, and that all the modifications not departing from the spirit and scope of the present invention are within the scope as defined in the following claims.

What is claimed is:

1. A method for culturing a vertebrate fish comprising:
   immuno-inhibiting the function of secreted protein acidic and rich in cysteine (SPARC) in a vertebrate fish by feeding the vertebrate with a feed composition comprising a fragment of secreted protein acidic and rich in cysteine prepared by amplifying SPARC gene using primer 1 (SEQ ID NO: 3) and primer 2 (SEQ ID NO: 4), wherein the secreted protein acidic and rich in cysteine or the fragment of secreted protein acidic and rich in cysteine is expressed in a microorganism; and
   harvesting the vertebrate fish;
   wherein the fragment of secreted protein acidic and rich in cysteine prepared by amplifying SPARC gene using primer 1 (SEQ ID NO: 3) and primer 2 (SEQ ID NO: 4) is an epitope.

2. The method according to claim 1, wherein the fragment of secreted protein acidic and rich in cysteine prepared by amplifying SPARC gene using primer 1 (SEQ ID NO: 3) and primer 2 (SEQ ID NO: 4) is contained in a fusion protein.

3. The method according to claim 2, wherein the fragment of secreted protein acidic and rich in cysteine prepared by amplifying SPARC gene using primer 1 (SEQ ID NO: 3) and primer 2 (SEQ ID NO: 4) is fused with a domain Ia of *Pseudomonas* exotoxin A.

4. The method according to claim 2, wherein the fragment of secreted protein acidic and rich in cysteine prepared by amplifying SPARC gene using primer 1 (SEQ ID NO: 3) and primer 2 (SEQ ID NO: 4) in the fusion protein is tandem repeated.

5. The method according to claim 1, wherein the secreted protein acidic and rich in cysteine or the fragment of secreted protein acidic and rich in cysteine prepared by amplifying SPARC gene using primer 1 (SEQ ID NO: 3) and primer 2 (SEQ ID NO: 4) is bioencapsulated in a shrimp.

6. The method according to claim 1, which further comprises administrating myostatin, a fragment of myostatin having the sequence shown in SEQ ID NO:1, an anti-myostatin antibody or anti-fragment of myostatin having the sequence shown in SEQ ID NO:1 antibody to the vertebrate.

7. The method according to claim 6, wherein the fragment of myostatin having the sequence shown in SEQ ID NO:1 comprises the C terminal region of myostatin.

8. The method according to claim 6, wherein the fragment of myostatin having the sequence shown in SEQ ID NO:1 is an epitope.

9. The method according to claim 6, wherein the fragment of myostatin having the sequence shown in SEQ ID NO:1 is contained in a fusion protein.

10. The method according to claim 9, wherein the fragment of myostatin having the sequence shown in SEQ ID NO:1 in the fusion protein is tandem repeated.

11. The method according to claim 9, wherein the fragment of myostatin having the sequence shown in SEQ ID NO:1 is fused with a domain Ia of *Pseudomonas* exotoxin A.

12. The method according to claim 6, wherein the myostatin, the fragment of myostatin having the sequence shown in SEQ ID NO:1, the anti-myostatin antibody or anti-fragment of myostatin having the sequence shown in SEQ ID NO:1 antibody is contained in the feed composition.

13. The method according to claim 6, wherein the myostatin, the fragment of myostatin having the sequence shown in SEQ ID NO:1, the anti-myostatin antibody or anti-fragment of myostatin having the sequence shown in SEQ ID NO:1 antibody is bioencapsulated in a shrimp.

14. The method according to claim 6, wherein the myostatin, the fragment of myostatin having the sequence shown in SEQ ID NO:1, the anti-myostatin antibody or anti-fragment of myostatin having the sequence shown in SEQ ID NO:1 antibody is administrated by injection.

* * * * *

SEQUENCE LISTING

<160> NUMBER OF SEQ ID NOS: 4

<210> SEQ ID NO 1
<211> LENGTH: 15
<212> TYPE: PRT
<213> ORGANISM: mouse

<400> SEQUENCE: 1

Asp Phe Gly Leu Asp Cys Asp Glu His Ser Thr Glu Ser Arg Cys
1               5                   10                  15

<210> SEQ ID NO 2
<211> LENGTH: 4
<212> TYPE: PRT
<213> ORGANISM: mouse

```
-continued

<220> FEATURE:
<221> NAME/KEY: X
<222> LOCATION: (1)..(4)
<223> OTHER INFORMATION: X is any amino acid residue

<400> SEQUENCE: 2

Arg Xaa Arg Arg
1

<210> SEQ ID NO 3
<211> LENGTH: 34
<212> TYPE: DNA
<213> ORGANISM: artificial
<220> FEATURE:
<223> OTHER INFORMATION: artificial primer

<400> SEQUENCE: 3
gcgccggaat tccgctccta ctgaggagga gccc                              34

<210> SEQ ID NO 4
<211> LENGTH: 35
<212> TYPE: DNA
<213> ORGANISM: artificial
<220> FEATURE:
<223> OTHER INFORMATION: artificial primer

<400> SEQUENCE: 4
gcgccgctcg aggatgatga ggtctttgtc cacgt                             35
```